United States Patent
Cakirogullari

(10) Patent No.: US 8,357,072 B2
(45) Date of Patent: Jan. 22, 2013

(54) VARIABLE SPEED DIRECT DRIVE TRANSMISSION

(75) Inventor: Cem Cakirogullari, Istanbul (TR)

(73) Assignee: Cakir Aga Motorlu Tasitlar Sanayi ve Ticaret Ltd. Sti., Istanbul (TR)

( * ) Notice: Subject to any disclaimer, the term of this patent is extended or adjusted under 35 U.S.C. 154(b) by 1149 days.

(21) Appl. No.: 12/097,396

(22) PCT Filed: Dec. 1, 2006

(86) PCT No.: PCT/EP2006/069220
§ 371 (c)(1),
(2), (4) Date: Sep. 30, 2008

(87) PCT Pub. No.: WO2008/064723
PCT Pub. Date: Jun. 5, 2008

(65) Prior Publication Data
US 2012/0065021 A1    Mar. 15, 2012

(51) Int. Cl.
*F16H 13/00* (2006.01)
(52) U.S. Cl. ............... 476/67; 180/220; 180/221
(58) Field of Classification Search .......... 476/67, 476/70; 180/220, 221
See application file for complete search history.

(56) References Cited

U.S. PATENT DOCUMENTS

| | | | |
|---|---|---|---|
| 3,891,044 A | 6/1975 | Tiede | |
| 4,081,048 A | 3/1978 | Hendricks | |
| 4,418,784 A * | 12/1983 | Fox | 180/221 |
| 5,237,263 A | 8/1993 | Gannon | |
| 5,423,393 A | 6/1995 | Felt | |
| 5,494,128 A * | 2/1996 | Witthaus | 180/221 |
| 5,660,242 A | 8/1997 | Witthaus | |
| 6,102,148 A * | 8/2000 | Chien | 180/220 |
| 6,394,213 B1 * | 5/2002 | Tsai | 180/181 |
| 6,482,121 B2 * | 11/2002 | Okoshi | 476/65 |
| 6,497,299 B1 * | 12/2002 | Sinclair et al. | 180/206.8 |
| 6,997,848 B1 * | 2/2006 | Cillessen et al. | 476/55 |
| 7,394,165 B2 * | 7/2008 | Schiller | 290/1 R |
| 7,641,580 B2 * | 1/2010 | Blanchard | 475/209 |
| 7,665,377 B2 * | 2/2010 | Harrelson et al. | 74/349 |
| 8,051,937 B2 * | 11/2011 | Pesenti | 180/205.4 |
| 2004/0055803 A1 | 3/2004 | Patmont | |
| 2004/0251068 A1 * | 12/2004 | Chen et al. | 180/221 |

FOREIGN PATENT DOCUMENTS

| | | |
|---|---|---|
| BE | 1002860 A7 | 7/1991 |
| DE | 834657 C | 3/1952 |
| DE | 896433 C | 11/1953 |
| DE | 9205672 U1 | 9/1992 |

(Continued)

*Primary Examiner* — David M Fenstermacher
(74) *Attorney, Agent, or Firm* — Arent Fox LLP

(57) ABSTRACT

A direct drive transmission system suitable for use with scooters, go-carts or motorcycles is disclosed. The transmission system comprises a drive shaft coupled to a motor shaft and a friction element which is guided longitudinally on said drive shaft, rotating with the rotation of the drive shaft. The system further comprises a roll bearing fixedly attached around at least part of the periphery of its inner ring to an end of the friction element and a stopper which is fixedly attached to the outer ring of said roll bearing. The stopper is adapted to affix a wire, which when pulled, moves longitudinally said friction element towards the inner end of the drive shaft so as to allow engagement of said friction element onto a traction surface of the drive wheel.

13 Claims, 17 Drawing Sheets

FOREIGN PATENT DOCUMENTS

| | | |
|---|---|---|
| DE | 4219763 A1 | 12/1993 |
| EP | 0145431 A | 6/1985 |
| FR | 1031966 A | 6/1953 |
| WO | WO 85/03266 A | 8/1985 |

* cited by examiner

1

VARIABLE SPEED DIRECT DRIVE TRANSMISSION

CROSS-REFERENCE TO RELATED APPLICATION

This is a National Stage entry of International Application No. PCT/EP2006/069220, filed Dec. 1, 2006. The disclosure of the prior application is hereby incorporated herein in its entirety by reference.

The present invention relates to a transmission system particularly for scooters, go-carts, motorcycles or the like, suitable for direct drive applications. The invention foresees use of a friction element which is movable in the direction of the primary axis of the motor drive shaft and which acts as a shift that changes the torque applied to the periphery of a wheel, thereby enabling the rider to ride the vehicle at a desired speed. The transmission system according to the present invention allows the rider to shift when the motor is running and during ride.

BACKGROUND OF THE INVENTION

Lately, fuel propelled engines have been proposed for scooters, motorcycles and go-carts for use in daily life. These are typically light weight, easy to use and inexpensive vehicles, generally for use under favorable weather conditions. Simple fuel propelled engines proposed for driving these vehicles however, do not have complicated systems other than a basic throttle mechanism for changing the rpm (revolution per minute) of the motor. Mostly, a basic throttle mechanism has a limited capability to adjust the speed of the vehicle in the absence of a transmission that can shift the rpm transmitted to the drive wheel(s). Electric motors, as an alternative power source, do likewise have drive circuits that add on to the price of the vehicle and can serve only in limited ranges for changing the speed of the vehicle. Furthermore, they are restricted with the characteristics of the motor and of course, the batteries carried on the vehicle. The purpose behind these limitations is to restrict the weight of the vehicle as well as to reduce the price associated with complex speed varying systems in both types of motors. Nevertheless, users still feel the need to change the speed of the vehicle or torque applied on the driving wheel at varying times. If the vehicle route is generally smooth and presents low resistance to vehicle passage, riders generally complain on the relatively low vehicle speed and desire to ride at higher speeds. In other cases e.g. where the vehicle route presents high resistance to vehicle passage or comprises hills, users generally complain that the vehicle is incompetent to comfortably climb the hill at varying inclination. At this point, a mechanical shifting system which only slightly contributes to weight of the vehicle and which effectively serves both needs (high speed on smooth surfaces and high torque on hill climbing) without add on installation on the motor or an extra amount on the price of the vehicle is needed.

A further restriction on the transmission systems for scooters, go-carts or motorcycles is the fact that there is generally very limited space on the vehicle. An ideal system is the one that occupies minimum volume in between the drive wheel and the propulsion system. Moreover, it should be noted that in cases where the transmission system comprises a plurality of moving or rotating parts, their inertia adversely affect the dynamic stability of the vehicle especially during shifting, which is an undesired effect of such transmission systems.

Various transmission systems have been proposed so far for scooters, go-carts or motorcycles that are driven directly or indirectly by a motor, generally an electric motor or fuel propelled engine. Among these, chain transmissions, gear transmissions or fluid operated transmissions are conventional ones and already known for long decades. In addition thereto, direct drive transmission systems were developed to reduce mechanical losses arising from the presence of a transmission mechanism comprising a plurality of moving parts. Direct drive transmission systems comprise an actuator which is directly in contact with the driving wheel(s) of a vehicle and do lack a belt or gear driven transmission element that could result in loss of kinematic energy, generally by way of friction losses. As the transmission system of the present invention relates to direct drive systems, the following documents have been considered as relevant.

BE 1002860 A (Meulebroecke, 1989) discloses a bicycle equipped with an auxiliary transmission system driven by a battery operated electric motor. The auxiliary transmission system proposed by Meulebroecke comprises a conical actuating member that is directly in contact with the driving wheel and that enables the user to continuously vary the speed of the bicycle. The battery operated electric motor and the conical actuating member is guided on a rod which is fixedly attached to the chassis of the bicycle and which allows for axial movement of entire drive unit, i.e. the battery operated electric motor and the conical actuating member. Once the drive unit moves axially on its guide, the conical actuation member contacts the tire at a varying location on its outer perimeter and changes the rpm transmitted onto the drive wheel. A major problem associated with this type of drive systems is the need to move back and forth entire driving mechanism including the motor and the transmission element i.e. the conical actuation member and possibly, the batteries. High mass of these parts pose a threat that is likely to impede effective working of the drive unit and to differentiate the speed applied on the drive wheel. In addition, inertia of the entire drive system and the need to change its location during driving inadvertently affect the kinematic stability of the vehicle to which this proposed drive system is installed. A further drawback of this transmission system proves itself in the difficulty of moving a relatively heavy motor, transmission element and couplings of the same with the aid of a simple protrusion cable through which a wire is proposed to readily slide for moving back and forth the entire drive unit.

U.S. Pat. No. 3,891,044 (Tiede, 1973) discloses a drive system similar to that of Meulebroecke where the drive wheel is driven by one or two cone shaped rollers which contact the tire from its lateral surfaces. Likewise, the entire drive unit is proposed to move transitionally to change the rpm of the drive wheel during ride. Another drawback is based on the fact that the rider has to remove one of his hands from the handlebar of the vehicle and command the transmission system, which is a possible threat against the safety of the ride. Complex structure and multi axial movement requirements of the transmission system proposed by Tiede are likely to produce frequent breakdowns and high maintenance costs. Most of the drawbacks of the transmission system as proposed by Meulebroecke in the preceding paragraph also do apply to the transmission system of Tiede.

DE 9205672 U (Hofberger, 1992) shows a drive system that comprises a stepped actuation member coupled to a battery operated motor and a mechanism to engage and disengage the drive system onto the tire of the bicycle. The mechanism requires the user to pull a rod that moves the entire group of transmission elements, the electric motor and the stepped actuation member, which after sufficient displacement, is pressed against the traction surface of a drive wheel. High inertia of the entire drive system is one of the major drawbacks of this drive unit as the total inertia of the entire drive and transmission organs is likely to impede easy shifting operation and to disrupt stable movement of the vehicle. Most of the drawbacks of the transmission system as proposed by Tiede in the preceding paragraph also apply to the transmission system of Hofberger.

U.S. Pat. No. 4,081,048 discloses a friction drive for a vehicle wherein a friction drive wheel is mounted to engage frictionally the pneumatic tire constituting the periphery of a vehicle traction wheel, such drive wheel being carried on a strut mounted to swing about an axis remote therefrom and which is parallel to and spaced from the axis of the traction wheel in an arrangement such that the strut is subjected to a reaction torque in response to driving friction force in one direction which in turn urges the center of the drive wheel towards the center of the ground wheel. The drive wheel is of frusto-conical configuration so that a variation in drive ratio can be driven by a storage battery.

US 2004/0055803 A1 (Patmont, 2003) discloses a variable speed transmission for a scooter. The transmission of Patmont foresees use of two inter-engaging parts that press onto the drive tire and that change the rpm applied on the tire by way of changing the outer diameter of the engaged parts. Keeping in mind that these inter-engaging parts are movable parts that are primarily responsible for transmitting the rotational power or the torque applied onto the drive wheel, those skilled in the art will readily appreciate how difficult it is to implement such an embodiment, if not inapplicable at all. High maintenance requirement of the system as well as the excessive wear expected on the traction surface of the tire are among other drawbacks of the transmission system proposed by Patmont. In addition, Patmont fails to teach a mechanism that enables shifting during ride.

OBJECTS OF THE INVENTION

An object of the present invention is to provide a variable transmission system which eliminates drawbacks of the existing transmission systems outlined above.

A further object of the present invention is to provide a transmission system which is actuated during ride by the movement of a friction element only and which provides stepped or continuously variable transmission of motor revolutions to the drive wheel(s).

A further object of the present invention is to provide a transmission system which is adapted to be installed as an add-on to existing vehicles, and particularly to scooters, which are already equipped with a direct drive transmission system that do or do not allow variable motor speed.

Still a further object of the present invention is to provide a user-friendly transmission system particularly suitable for scooters, go-carts, motorcycles or the like and occupying a very small volume in between the drive wheel(s) and the propulsion system.

Still a further object of the present invention is to provide a transmission system which does not require axial or transitional movement of a motor or a coupling mechanism along the primary axis of a rotating drive shaft, whereby instability originating from shifting during riding is eliminated.

Still a further object of the present invention is to provide a transmission system which can be adapted to transmit to the drive wheel lower or higher revolutions during riding, which adaptation requires displacement of an actuating member only, thereby resulting in a minimized instability originating from inertia of rotating or stationary parts that are axially moved for shifting.

Yet another object of the present invention is to provide a transmission system which has a minimum number of moving parts to ensure long service life with minimized maintenance need.

Still a further object of the present invention is to provide a simple and easy to use transmission system which allows for easy installation as well as the possibility for use of minors or physically handicapped individuals.

Yet another object of the present invention is to provide an inexpensive and light weight transmission system providing variable speed transmission.

Yet another object of the present invention is to provide a variable transmission system which can be shifted by the rider without disruption of the ride or without removing one of the hands from the handlebar.

SUMMARY OF THE INVENTION

The transmission system according the present invention eliminates the drawbacks of the transmission systems of the prior art by way of utilization of a direct drive transmission system comprising a drive shaft coupled to a motor shaft and a friction element guided longitudinally along the primary axis of said drive shaft. The friction member rotates with the rotation of the drive shaft. A roll bearing is fixedly attached around preferably the entire periphery of its inner ring to the outer end of the friction element. A stopper is fixedly attached to the outer ring of the roll bearing whereby the stopper fixedly holds a wire, which when pulled, moves longitudinally the friction element towards the inner end of the drive shaft so as to allow engagement of said friction element onto the traction surface of the drive wheel. A spring is foreseen to prevent the friction element to unintentionally slide inwards and shift the transmission.

An alternative embodiment according to the present invention utilizes a conical transition zone on the friction element for easy operation of said friction element on its guide on the drive shaft. The conical zone allows simple switches back and forth longitudinally in between the shifted modes of the transmission system. Alternatively, the conical zone may be utilized to apply a continuously varying transmission rather than a stepped transmission.

DETAILED DESCRIPTION OF THE INVENTION

The transmission system according to the present invention comprises of a drive shaft which is coupled via a coupling to a motor shaft, a friction element which is guided on said drive shaft and which rotates with the rotation of the drive shaft, a roll bearing, typically a ball bearing which is fixedly attached around the periphery of its inner ring to said friction element and which is coupled to a protrusion cable at any location around its outer ring, said protrusion cable being adapted, by way of movement of a shift lever, to move back and forth the friction element on the primary axis of said drive shaft.

Many of the scooters have a tilt mode where the motor is simply tilted to a position where the drive shaft disengages the drive wheel or the transmission system of the vehicle. This is especially useful when the rider needs to temporarily stop the vehicle, e.g. in front of traffic lights. When the vehicle is to be moved again, the rider can simply lower the motor or the drive shaft onto the drive wheel thereby engaging the drive shaft with the drive wheel. This engagement and disengagement can easily be achieved through use of a protruded steel wire and/or a spring loaded pusher or alternatively using a simple gear driven tilting mechanism.

Figure 1:
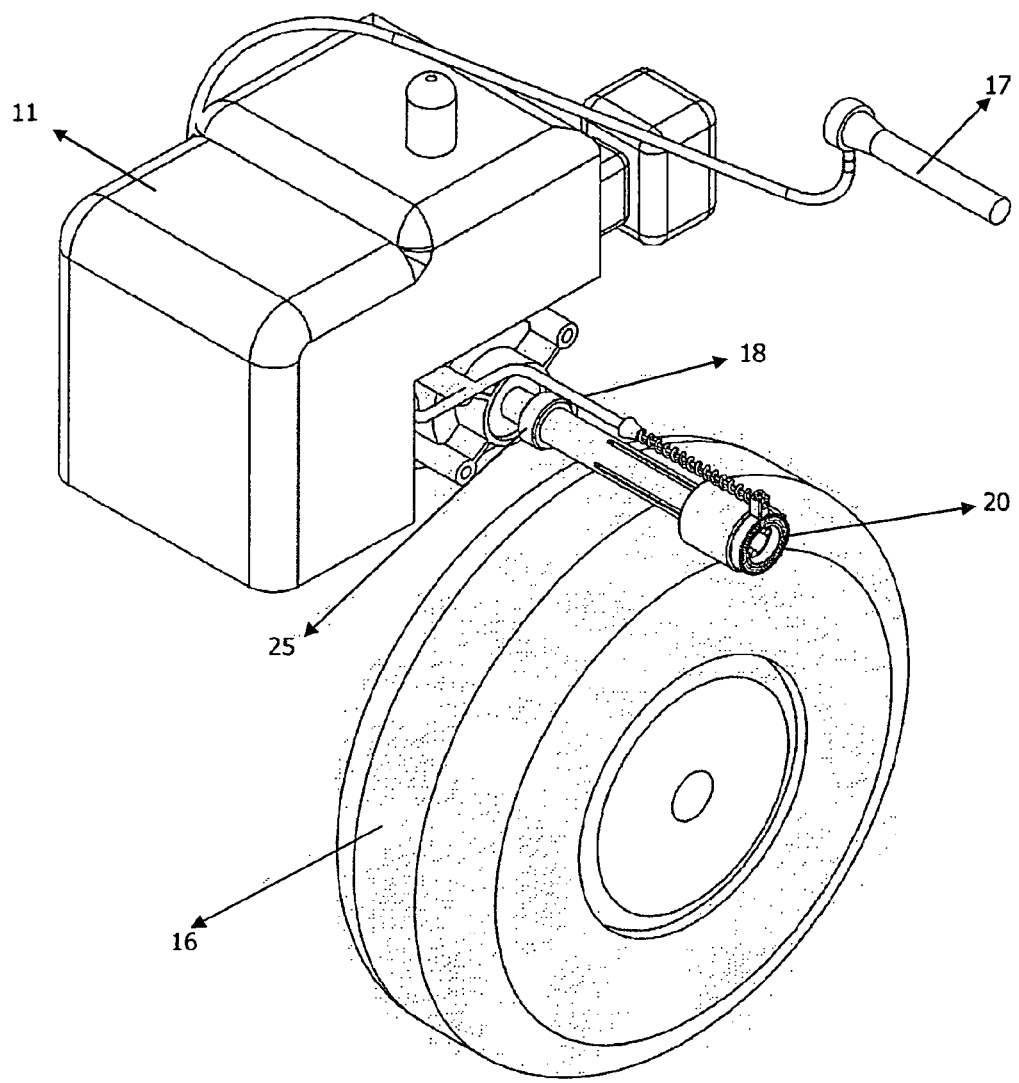
FIG. 1 shows perspective view of a transmission system according to a first embodiment of the present invention, where the transmission system is coupled to a motor and shown on top of a drive wheel.
Figure 2B:
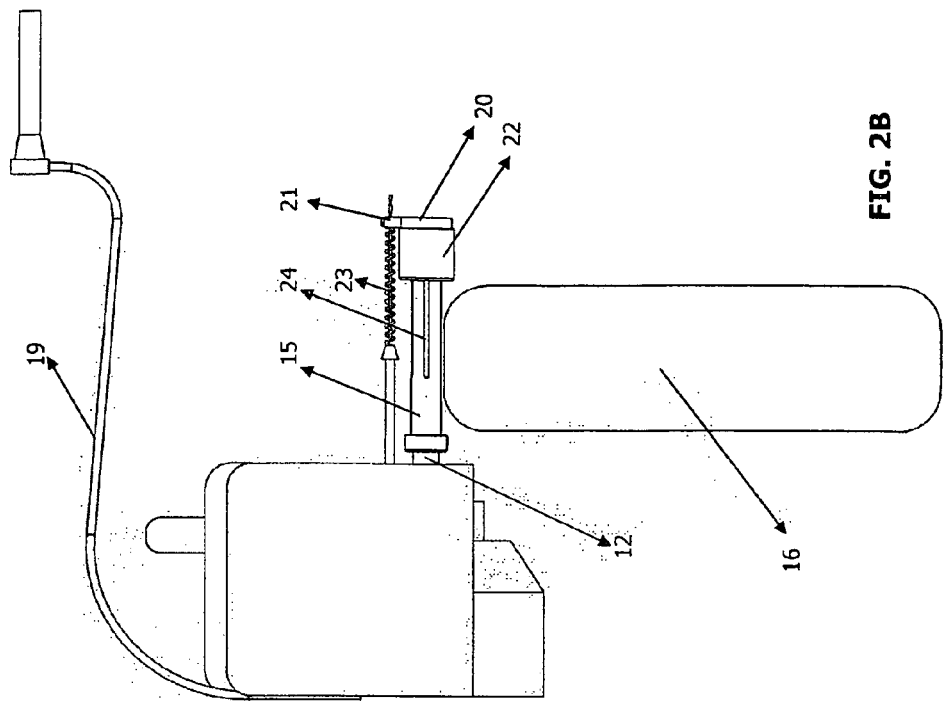
FIG. 2B shows a 2-D frontal view of the system of FIG. 1 in which the transmission system is engaged with the drive wheel.
Figure 2A:
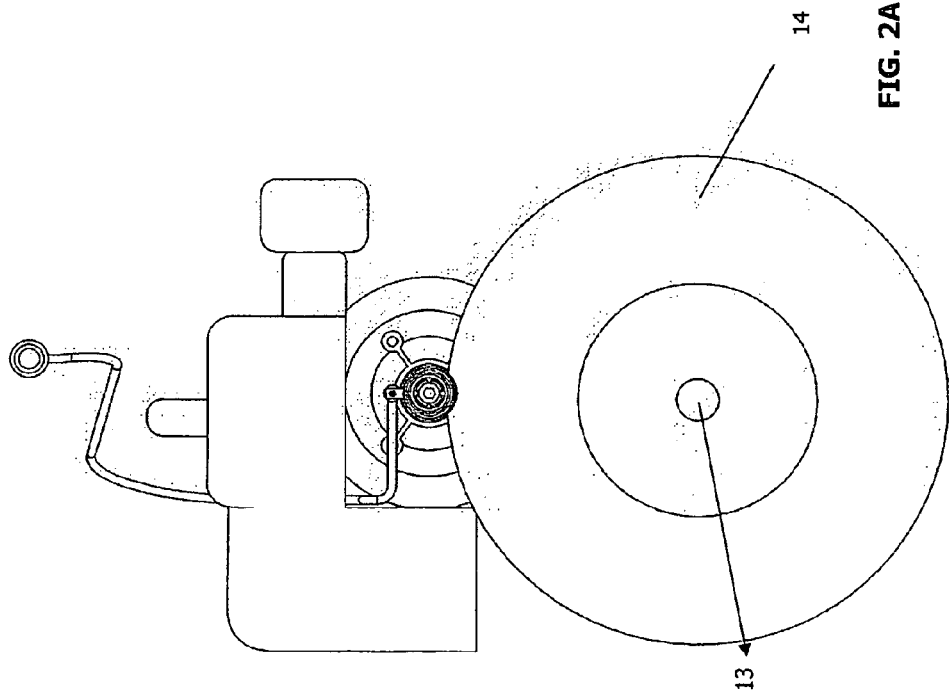
FIG. 2A shows a 2-D side view of the system of FIG. 1 in which the transmission system is engaged with the drive wheel.
Figure 3B:
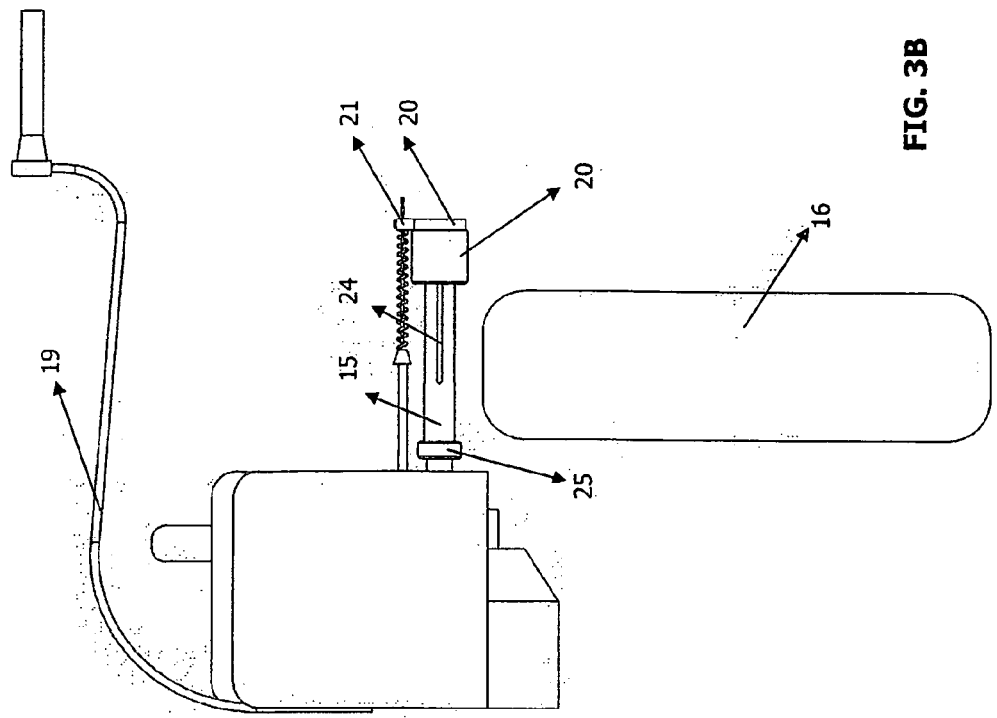
FIG. 3B shows a 2-D frontal view of the system of FIG. 1 in which the motor is in idle position.
Figure 3A:
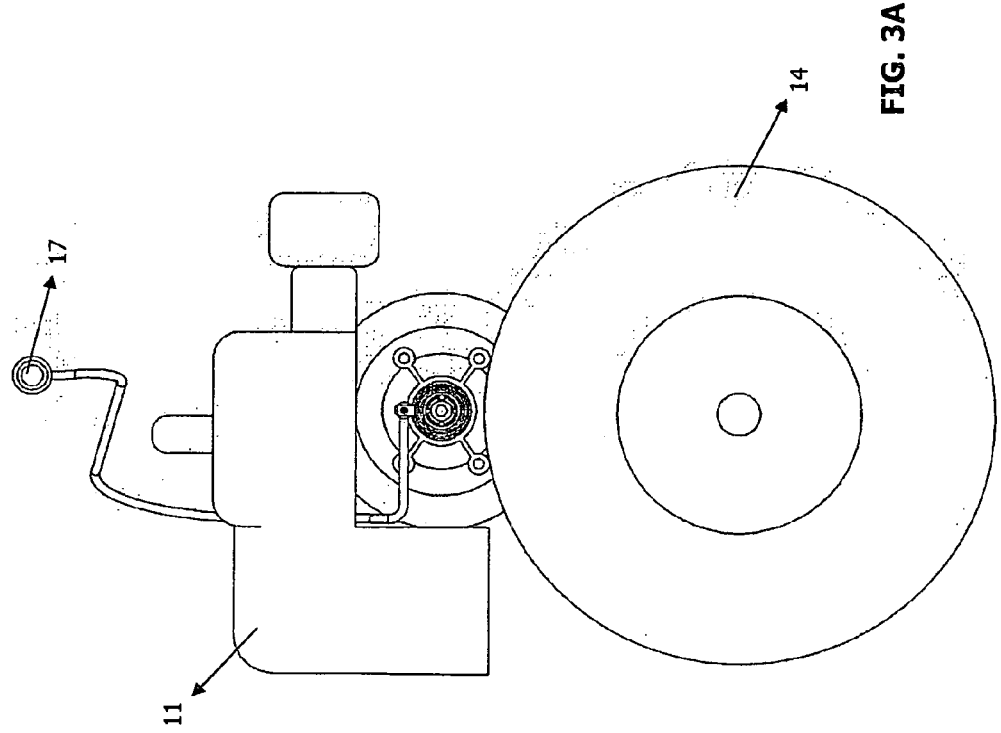
FIG. 3A shows a 2-D side view of the system of FIG. 1 in which the motor is in idle position.
Figure 4:
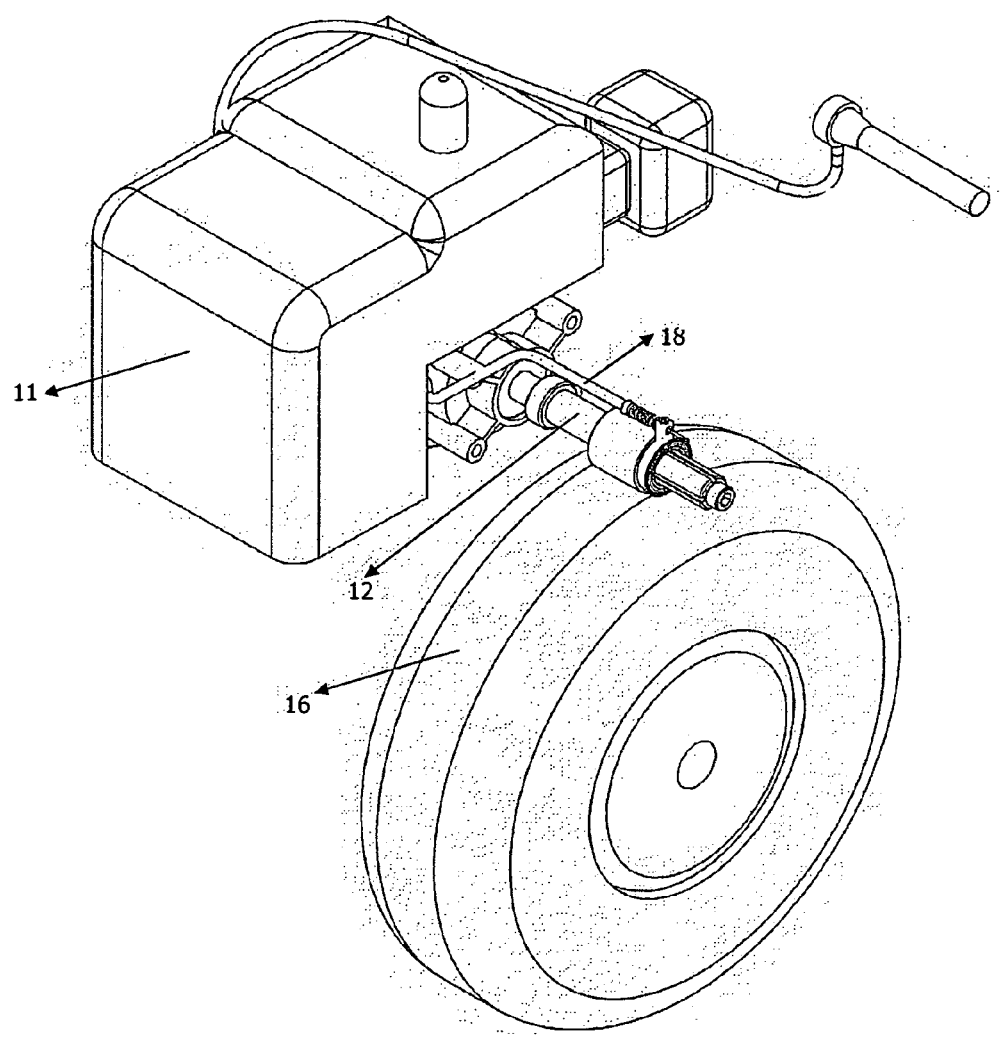
FIG. 4 shows perspective view of a transmission system of FIG. 1 in which the transmission system is shifted and in engagement with the drive wheel.
Figure 5A:
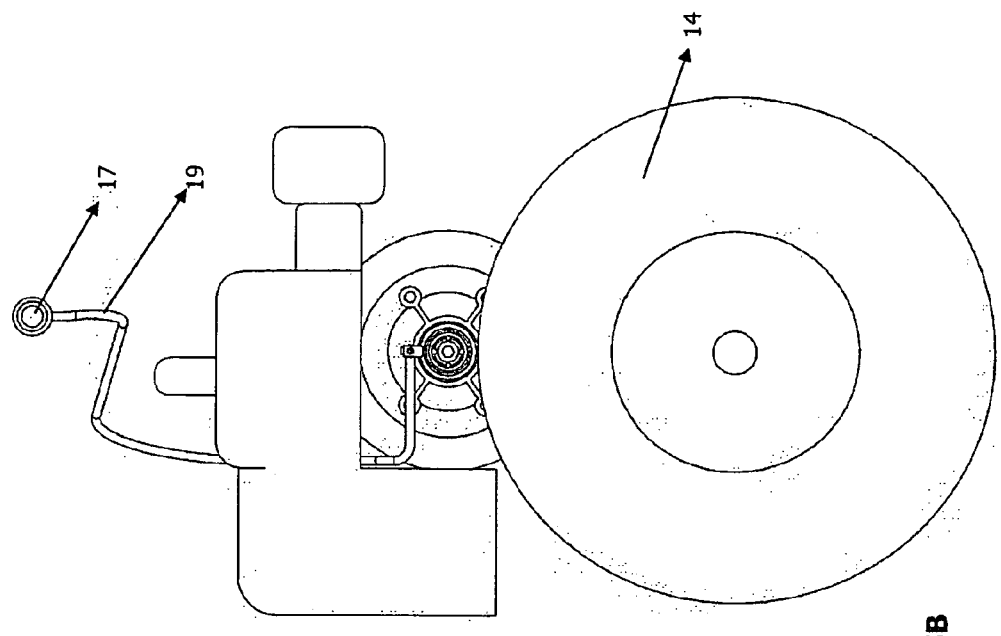
FIG. 5A shows a 2-D side view of the system of FIG. 4 in which the transmission system is shifted and in engagement with the drive wheel.
Figure 5B:
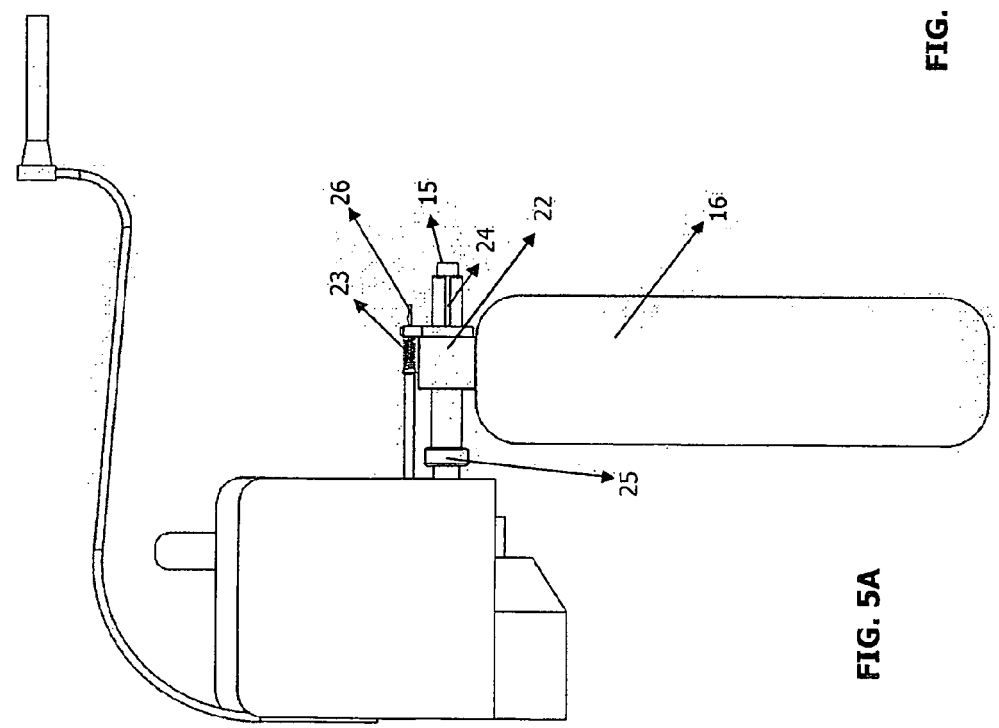
FIG. 5B shows a 2-D frontal view of the system of FIG. 4 in which the transmission system is shifted and in engagement with the drive wheel.
Figure 6A:
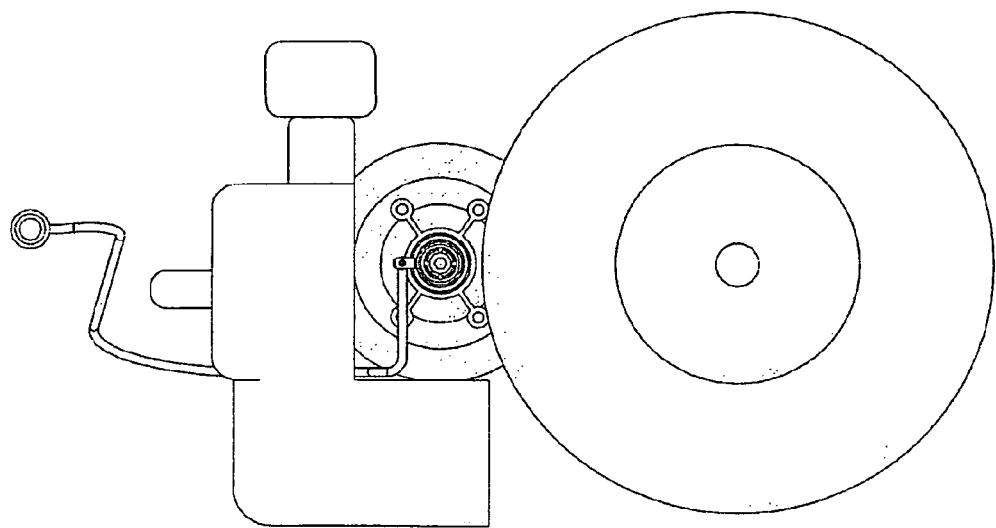
FIG. 6A shows a 2-D side view of the shifted system of FIG. 4 in which the motor is in idle position.
Figure 6B:
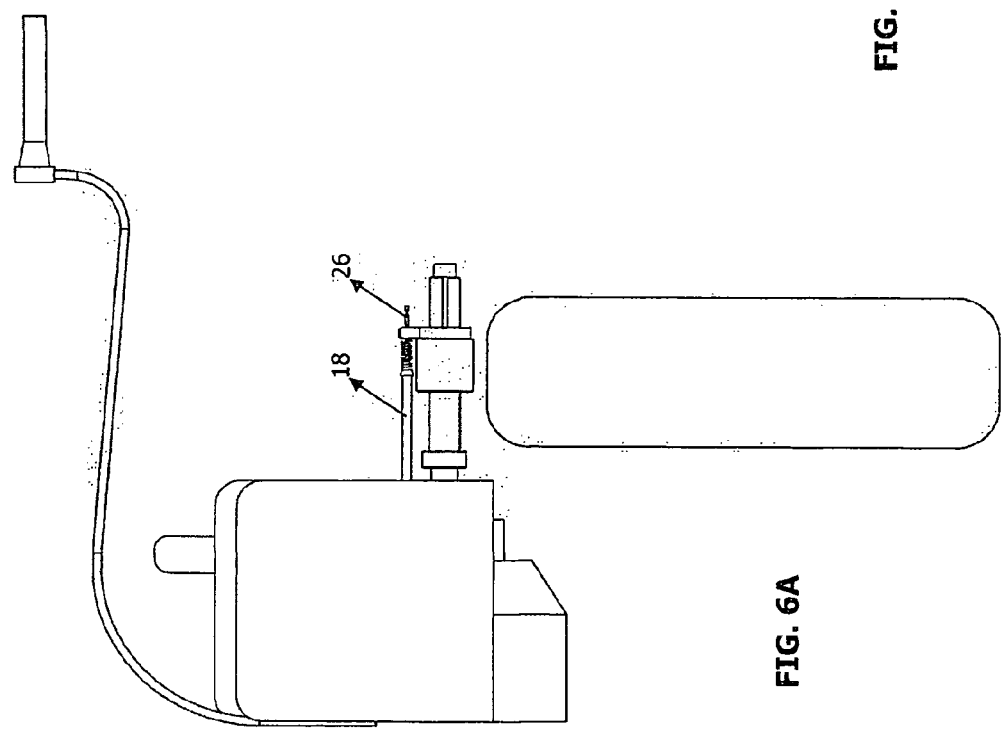
FIG. 6B shows a 2-D frontal view of the shifted system of FIG. 4 in which the motor is in idle position.
Figure 7:
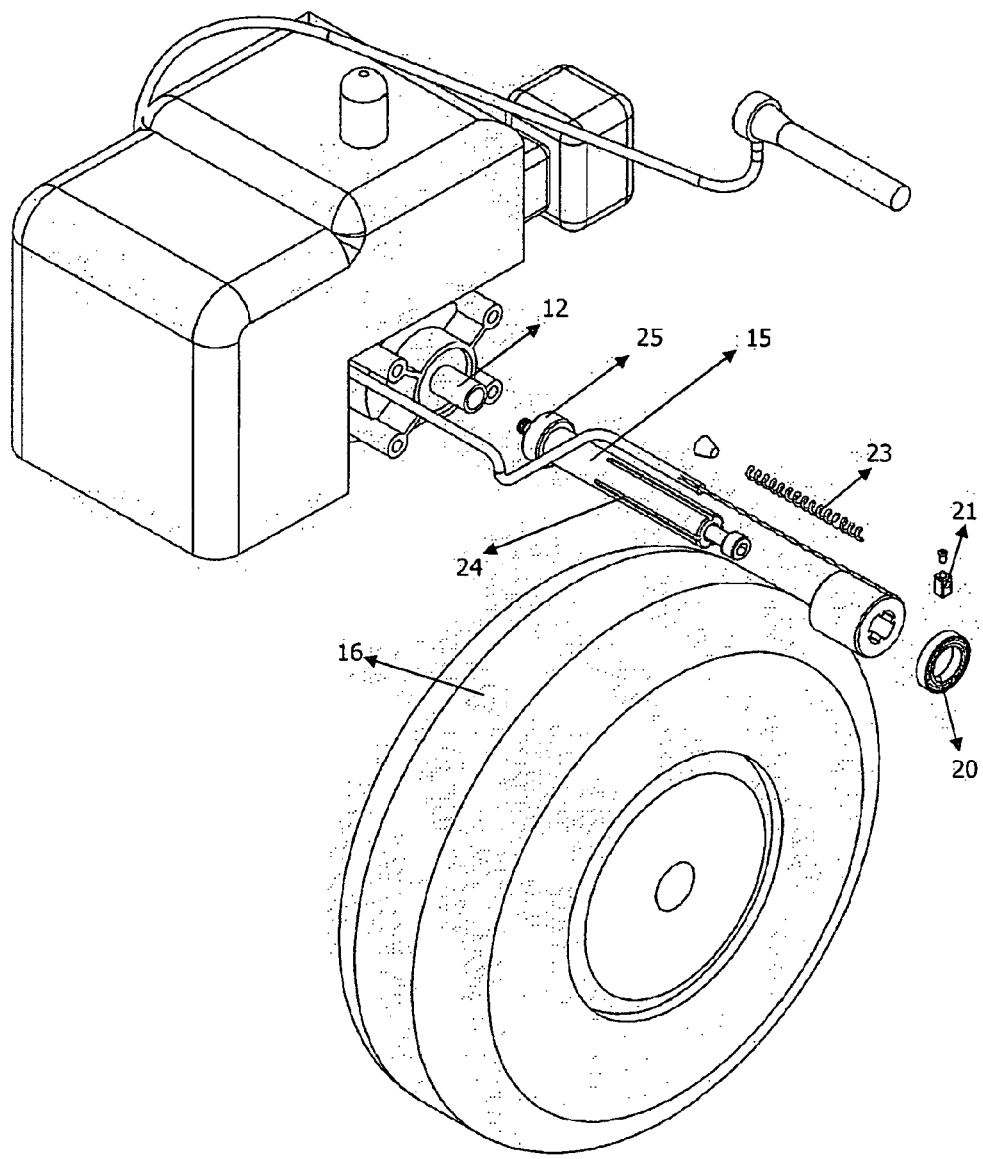
FIG. 7 is an exploded perspective view of the system of FIG. 1.
Figure 8:
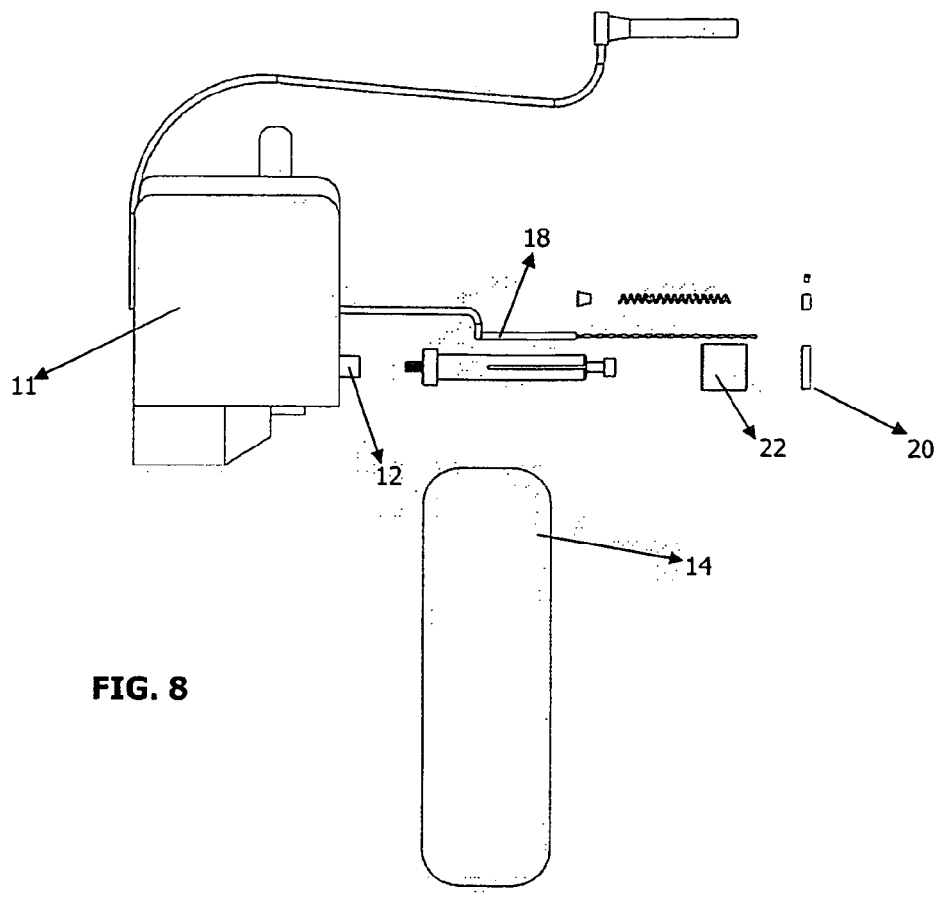
FIG. 8 is a 2-D exploded frontal view of FIG. 7.

According a first preferred embodiment of the present invention, the transmission system comprises a drive shaft (15) which is coupled by a coupling (25) to the motor shaft (12). When the motor (11) is started, the rotation of the motor shaft (12) is directly transferred to the drive shaft (15). At that time, the drive shaft (15) is preferably not engaged onto the drive wheel (14) that connected to the chassis of the vehicle by the hub (13). Typically, most of the motors for scooters or go-carts have a tilt position (see FIG. 3A, 3B, 6A, 6B, 12A, 12B, 15A, 15B) for idling the vehicle. If the vehicle was stopped temporarily and is intended for ride after a short interval, such as in the case of red traffic lights, the motor is tilted so as to disengage the drive shaft from the drive wheel (14) as seen e.g. on FIG. 3A, 3B. Once the vehicle is to be moved again, the motor (11) is removed from the tilt mode and the drive shaft (15) is engaged onto the traction surface (16) of the drive wheel (14) as illustrated e.g. in FIGS. 2A, 2B. The vehicle accelerates and gradually reaches its upper speed, which is determined by the ratio of the diameter of the drive shaft (15) and the diameter of the drive wheel (14).

A transmission system according to the first embodiment comprises a friction element (22) for outputting higher rpm, compared to that output by the main drive shaft (15), onto the drive wheel (14). The friction element (22) engages to the traction surface (16) of the wheel (14) when the user pulls or triggers a shift lever (17), in result of which a metal wire (26) slides through a protrusion cable (19) and pulls a roll bearing (20) attached at the outer end of the said friction element (22).

Figure 10A:
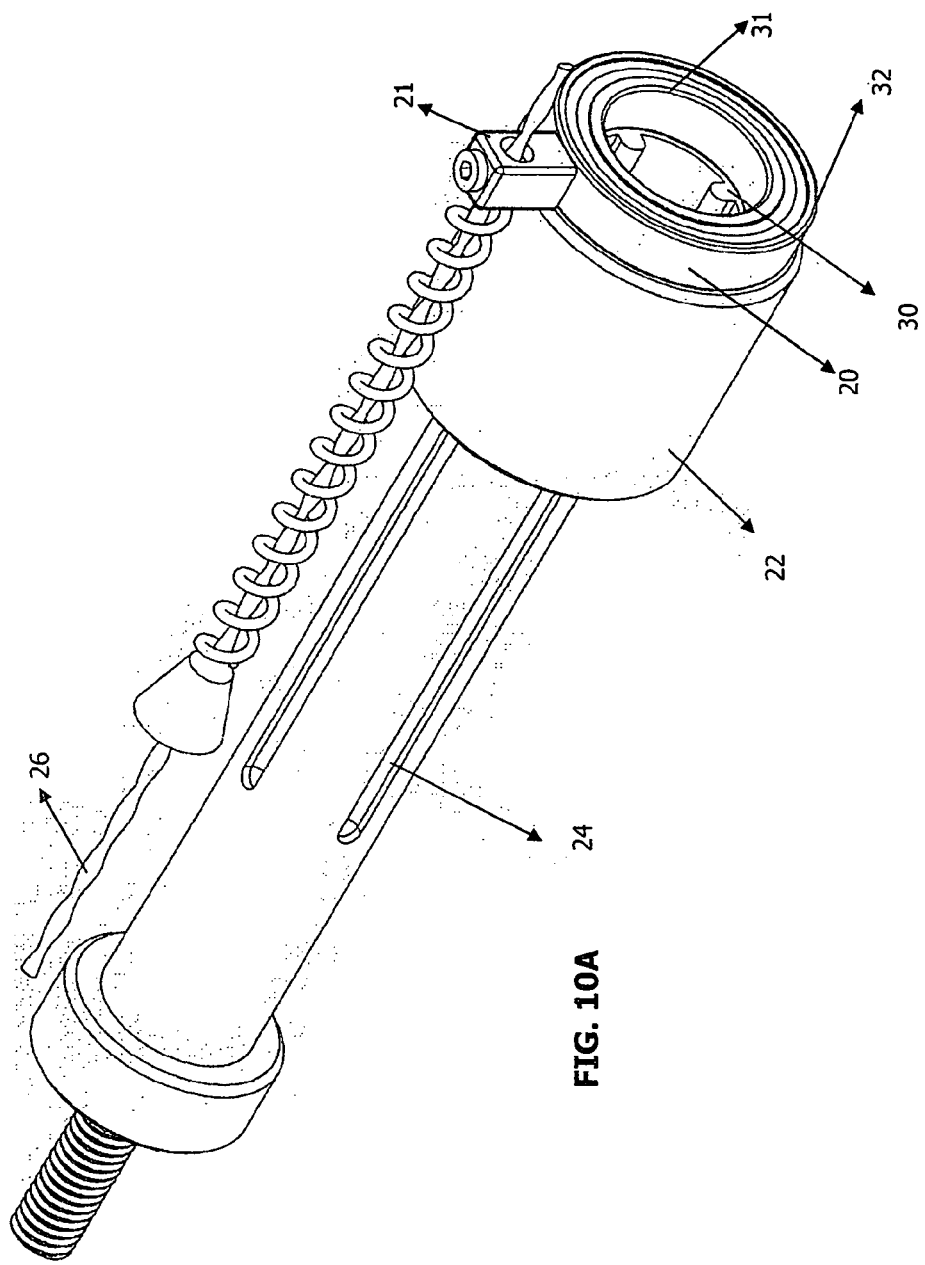
FIG. 10A shows perspective view of a transmission system according to a first embodiment of the present invention, where the stepped friction element is not shifted.
Figure 10B:
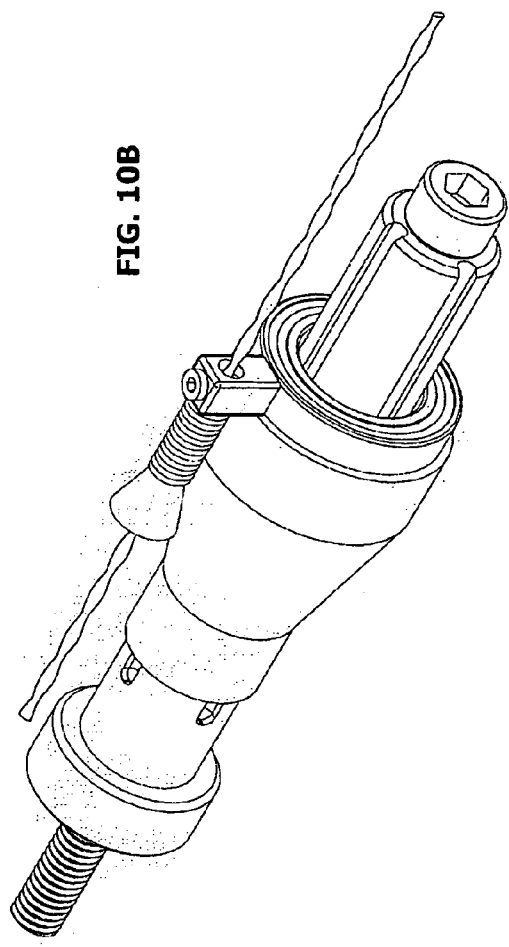
FIG. 10B shows perspective view of a transmission system according to a second embodiment of the present invention, where the conical friction element is shifted.
Figure 10C:
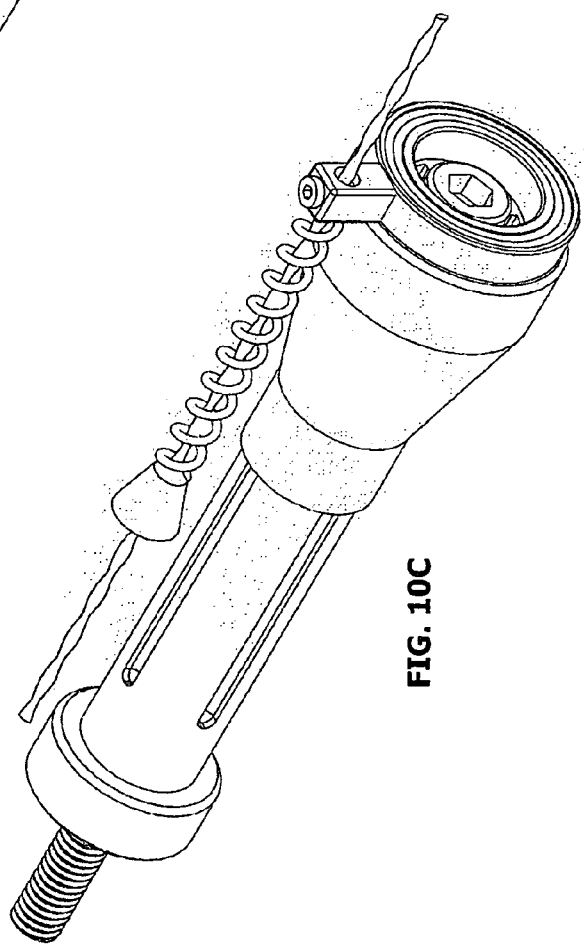
FIG. 10C shows perspective view of a transmission system according to a second embodiment of the present invention, where the conical friction element is not shifted.

The roll bearing (20) is typically in the form of a ball bearing having inner ring (31) and an outer ring (32). The inner ring (31) is fixedly attached to the outer end of the friction element (22) and rotates with the rotation of the friction element or eventually the drive shaft (15). As illustrated in FIG. 10, a stopper (21) is fixedly attached at any desired location on the periphery of the outer ring (32). Once the motor (11) is started, the inner ring (31) of the roll bearing rotates with the rotation of the friction element (22) coupled to the drive shaft (15) whereas the outer ring (32) of the roll bearing (20) remains stationary.

When the user pulls or triggers the shift lever (17), the amount of displacement of the metal wire (26) inside the protrusion cable (19) equals to the amount of the displacement of the friction element (22) on the primary axis of the drive shaft (15). The friction element (22) has projections (30) along its inner surface that fit to corresponding grooves (24) drilled on the drive shaft (15) in order to the guide the friction element (22) along the drive shaft (15) axially. The metal wire (26) should have a maximum length that prevents the friction element from falling off the drive shaft (15).

The metal wire (26) passes through a protruder (18) which is preferably a rigid pipe that avoids bending or sagging. A spring (23) is located in between the protruder (18) and the stopper (21) that is fixedly attached onto the roll bearing (20). The metal wire (26) is attached to the stopper (21) so as to move the friction element (22) back and forth along the primary axis of the drive shaft (15) depending on the choice of the user. The spring (23) primarily serves the purpose of preventing the friction element to unintentionally slide inwards and shift the transmission. Hence, it may be preferable to preload the spring (23) during installation to safely keep the friction element (22) in place at times the user does not pull the shift lever (17). However, it shall not be preloaded at an amount that could impede easy slide of the metal wire (26) and effective operation of the friction element (22) on the drive shaft (15). In combination thereto, the spring (23) is preferably set to push the friction element (22) towards the outer end of the drive shaft (15) so as the disengage friction element (22) when the shift lever (17) is released by the rider.

Figure 9A:
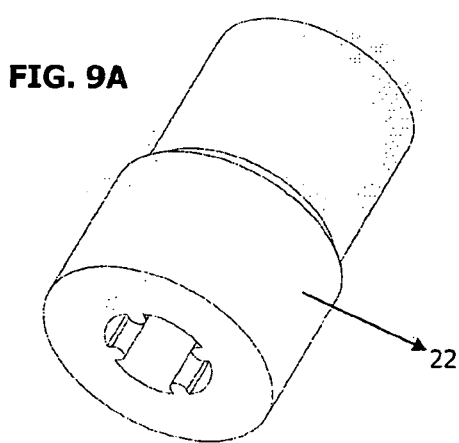
FIG. 9A is a perspective view of a stepped friction element according to the first embodiment of the present invention.
Figure 9B:
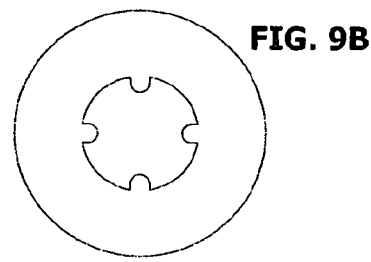
FIG. 9B is a 2-D frontal view of the friction element of FIG. 9A.

Apparently, this first embodiment of the present invention can be considered as a two shift transmission, one for high speed and one for low speed. The user can easily start the engine while in the tilted mode and then switch to the ride mode by way of engaging the drive shaft onto the wheel(s) after which he/she can readily and then can put the engine in the tilt mode during ride and finally pull or trigger the shift lever (17) to attain a higher speed upon engaging the friction element (22) rather than the drive shaft (15) onto the traction surface (16) of the drive wheel (14). In the event that the user requires climbing a hill, then he/she may easily disengage the friction element (22) by first putting the engine in tilt mode and reverse triggering the shift lever (17) and switching back to actuating the wheel (14) by drive shaft (15) which has lower diameter. Those skilled in the art will appreciate that the shift ratio can be easily changed to reach desired speeds in both cases. In cases where a stepped friction element as per seen on FIG. 9a is used, the number of steps or stages and hence, shifts can be easily increased.

As the inner ring (31) of the roll bearing (20) is fixedly attached to the friction element (22), they move inwards when the user pulls the shift lever (17) and engages the friction element onto the traction surface (16) of the drive wheel (14). Apparently, the inner ring (31) shall have an inner diameter that is larger than the outer diameter of the drive shaft (15). Preferably, the inner diameter of the inner ring (31) is slightly larger than the inner diameter of the friction element (22) and the outer diameter of the outer ring (32) is slightly smaller than the outer diameter of the friction element (22) as seen on FIG. 10.

Figure 11:
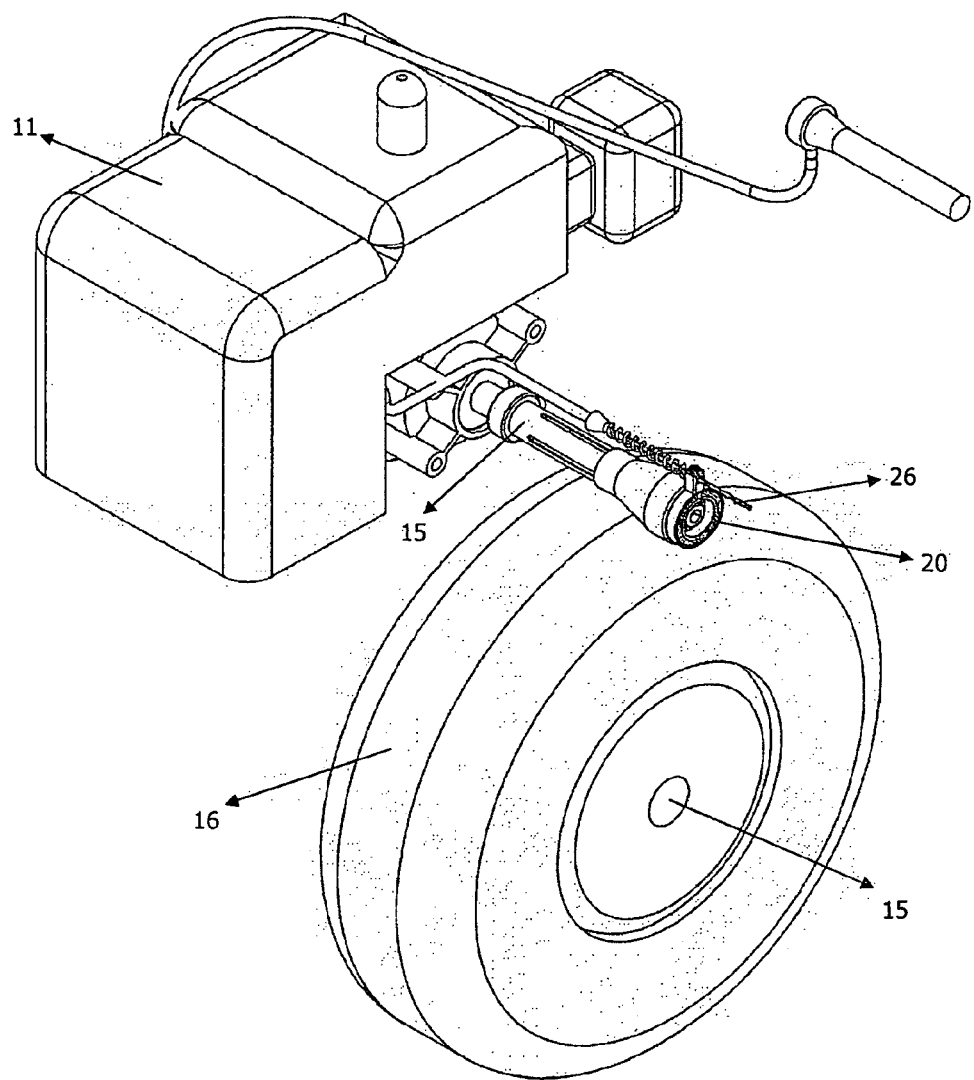
FIG. 11 shows perspective view of a transmission system according to a second embodiment of the present invention, where the transmission system is coupled to a motor and shown on top of a drive wheel to which the friction element firmly presses has a conical transition zone.
Figure 12B:
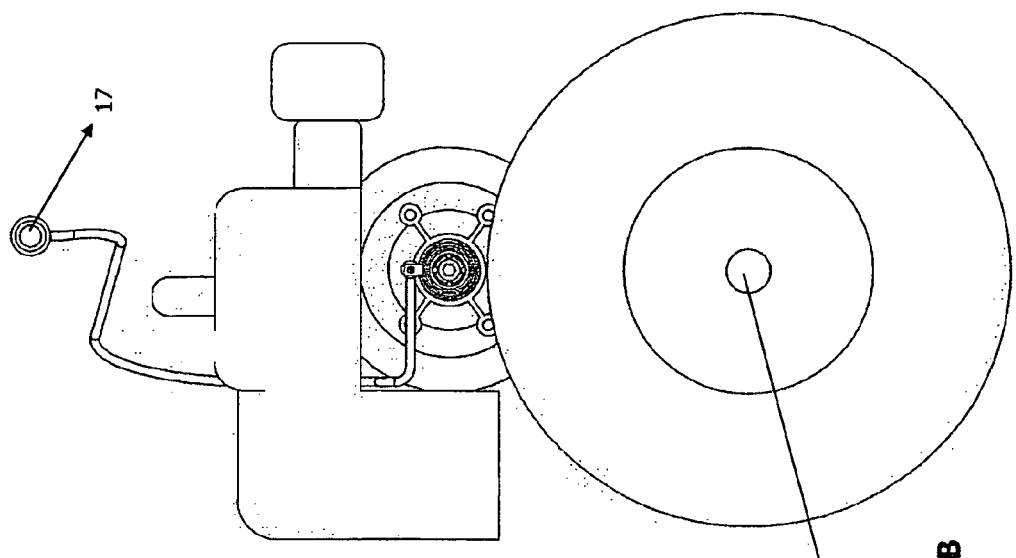
FIG. 12B shows a 2-D side view of the system of FIG. 11 in which the motor is in idle position.
Figure 12A:
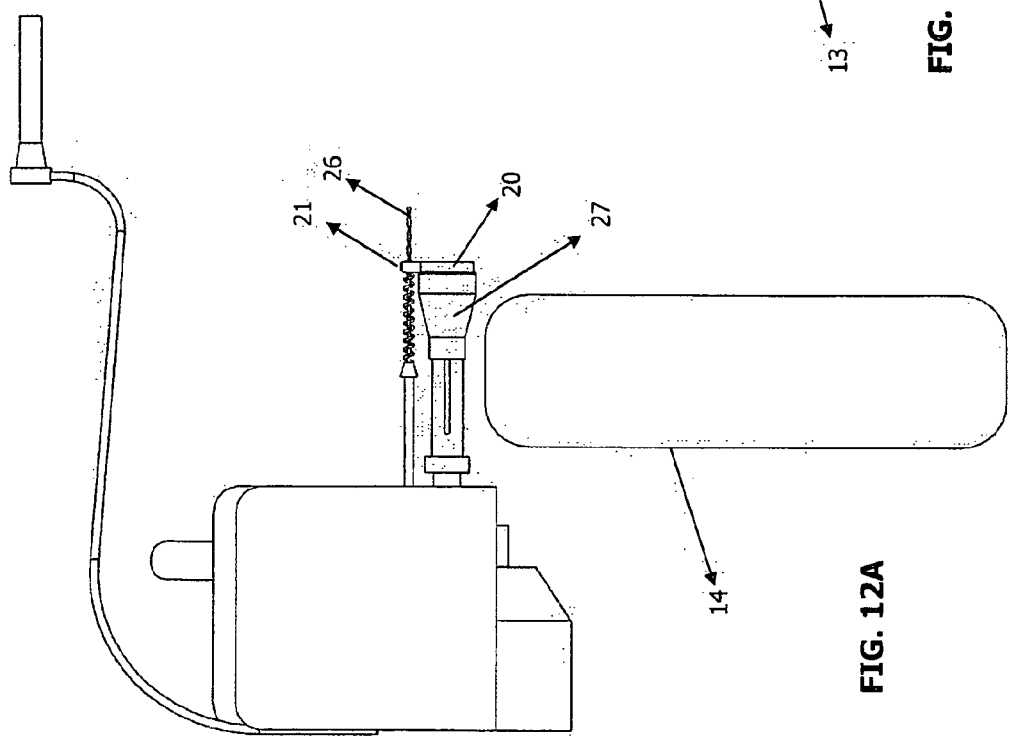
FIG. 12A shows a 2-D frontal view of the system of FIG. 11 in which the motor is in idle position.
Figure 13B:
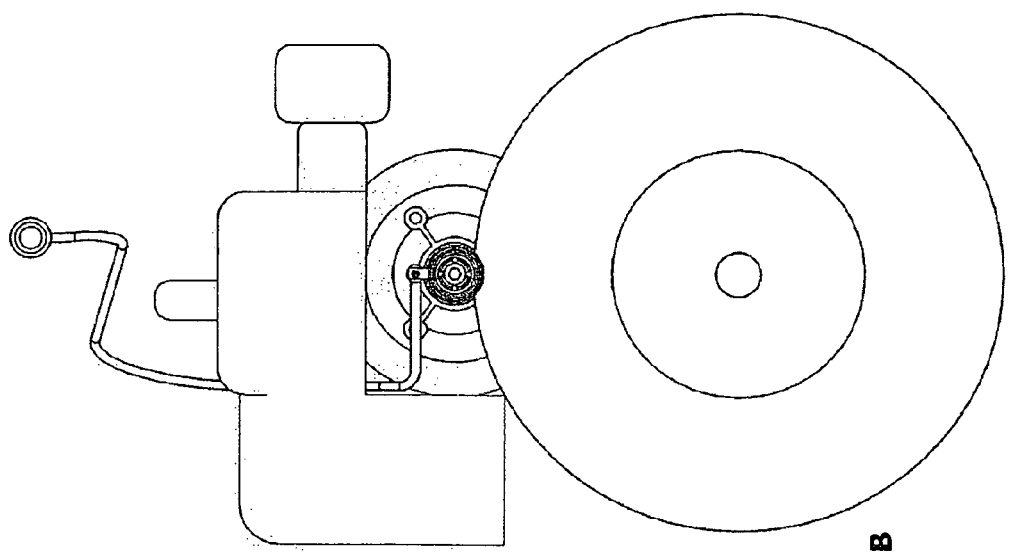
FIG. 13B shows a 2-D side view of the system of FIG. 11 in which the transmission system is engaged with the drive wheel.
Figure 13A:
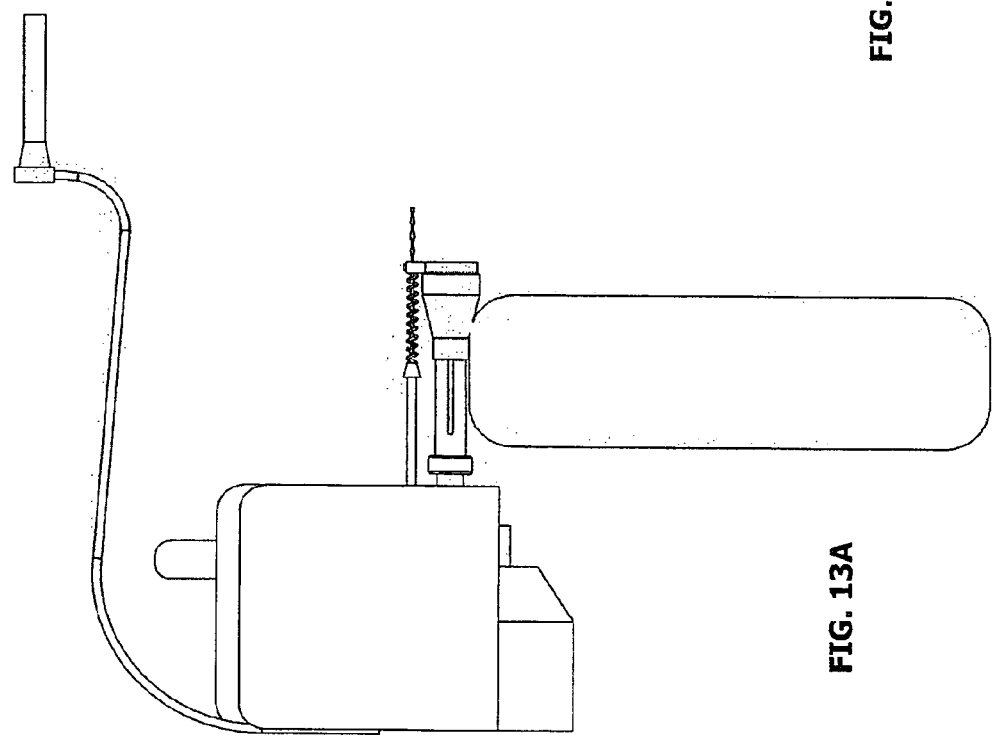
FIG. 13A shows a 2-D frontal view of the system of FIG. 11 in which the transmission system is engaged with the drive wheel.
Figure 14:
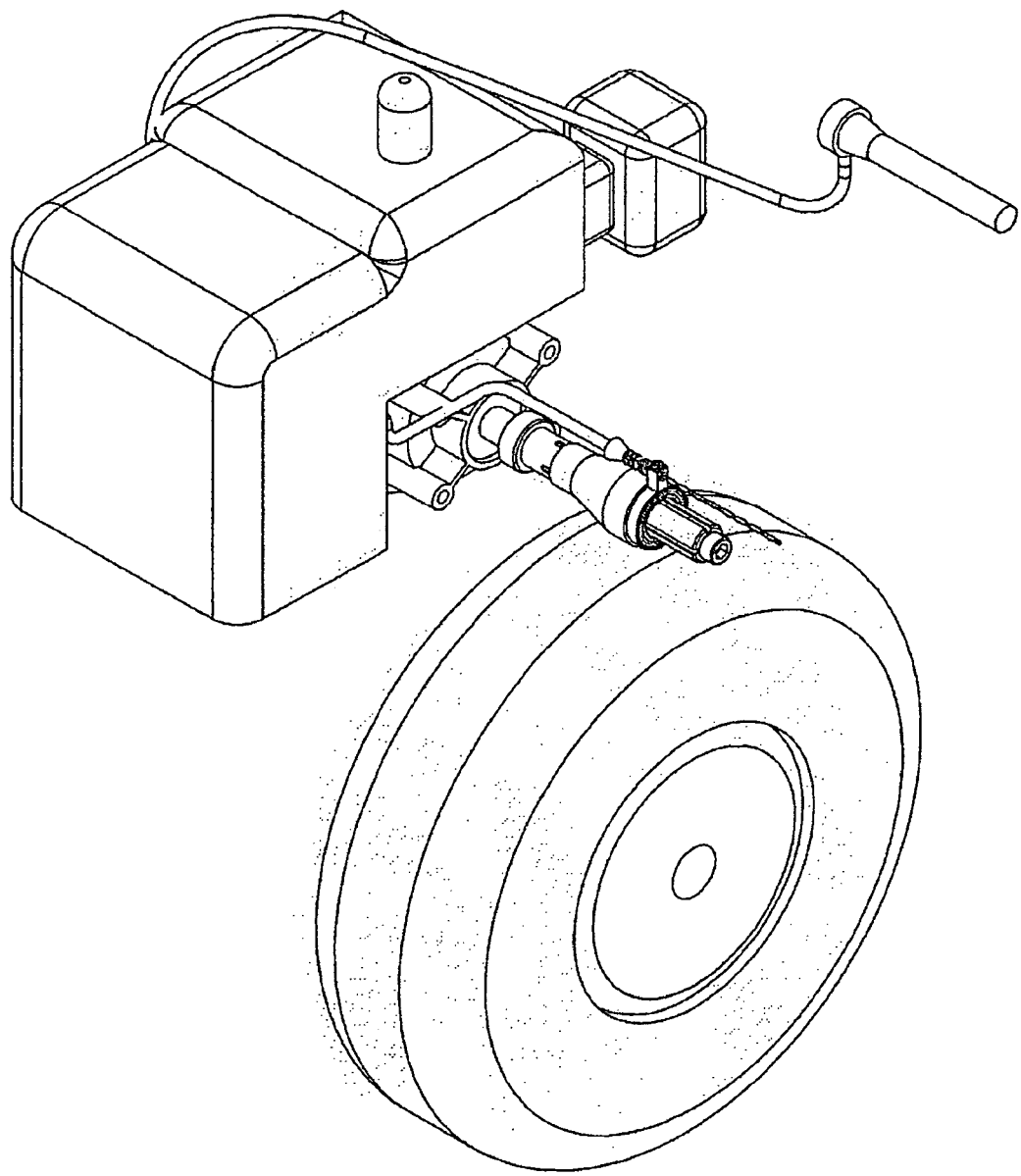
FIG. 14 shows perspective view of a transmission system of FIG. 11 in which the transmission system is shifted and in engagement with the drive wheel.
Figure 15B:
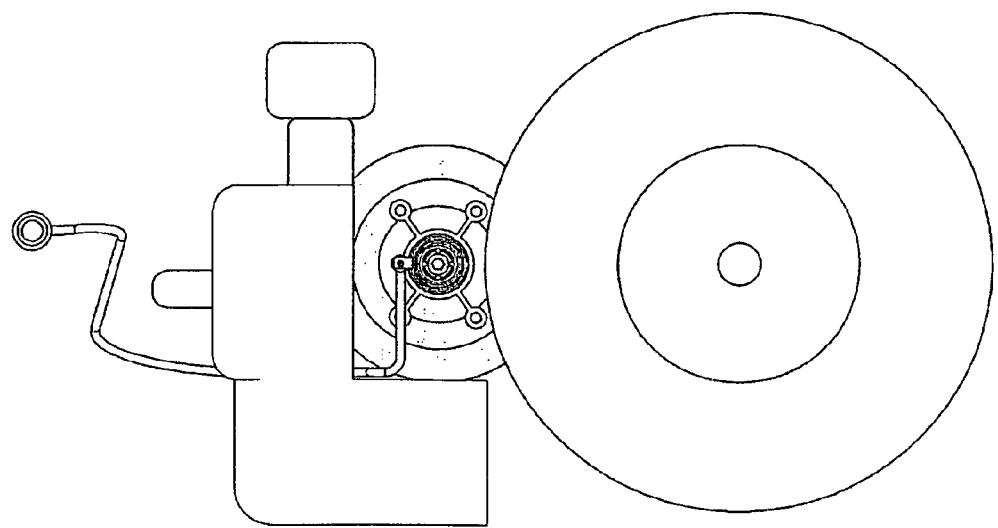
FIG. 15B shows a 2-D side view of the system of FIG. 11 in which the motor is in idle position.
Figure 15A:
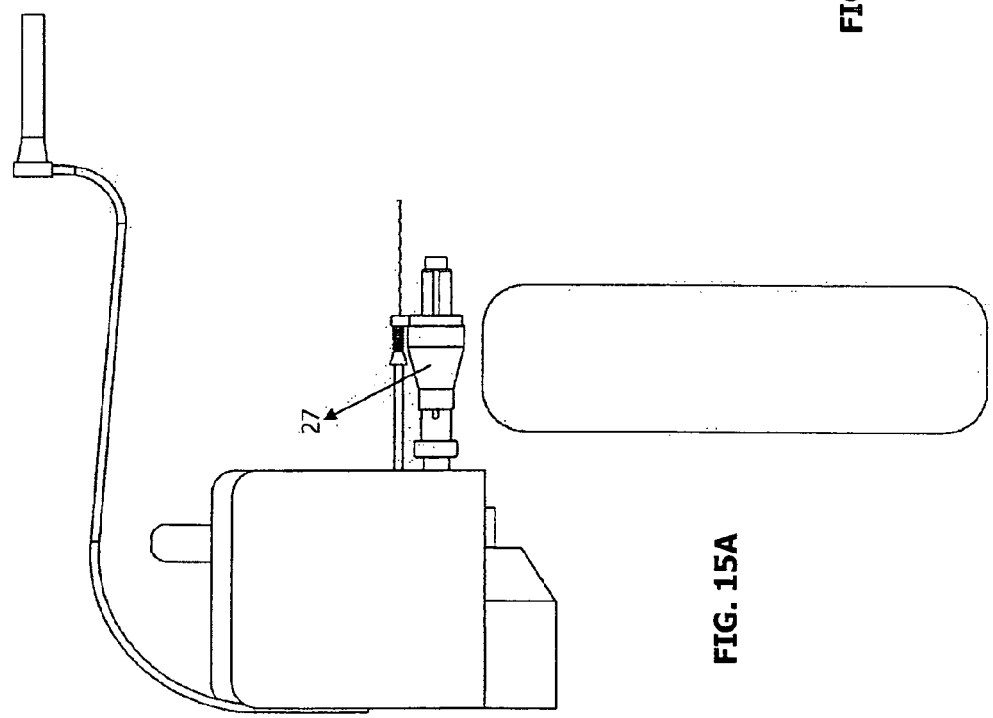
FIG. 15A shows a 2-D frontal view of the system of FIG. 11 in which the motor is in idle position.
Figure 16B:
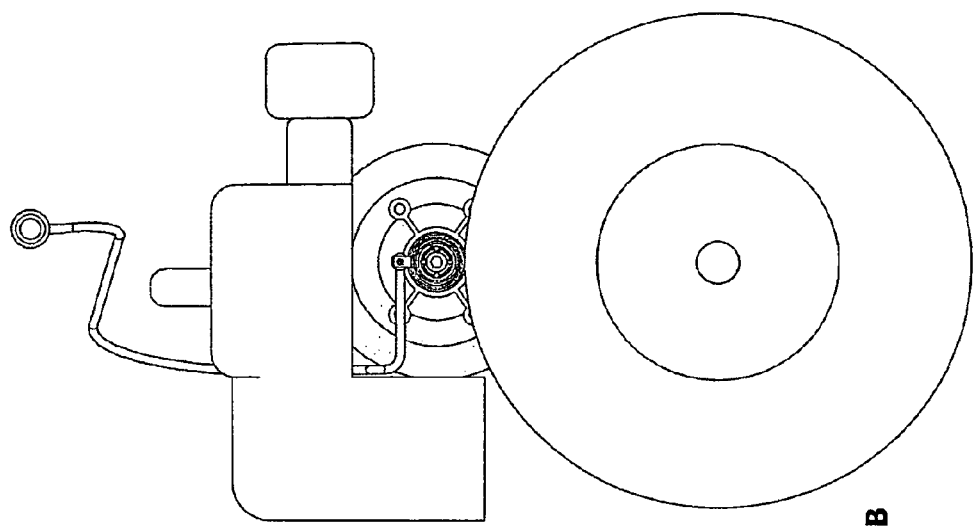
FIG. 16B shows a 2-D side view of the system of FIG. 11 in which the transmission system is engaged with the drive wheel.
Figure 16A:
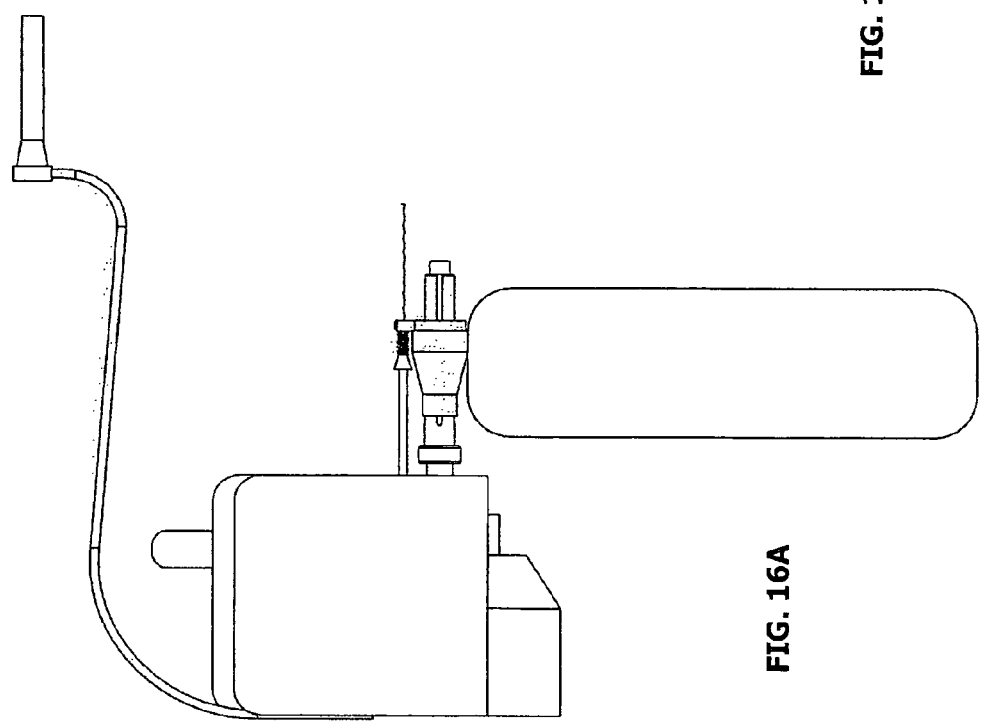
FIG. 16A shows a 2-D frontal view of the system of FIG. 11 in which the transmission system is engaged with the drive wheel.
Figure 17:
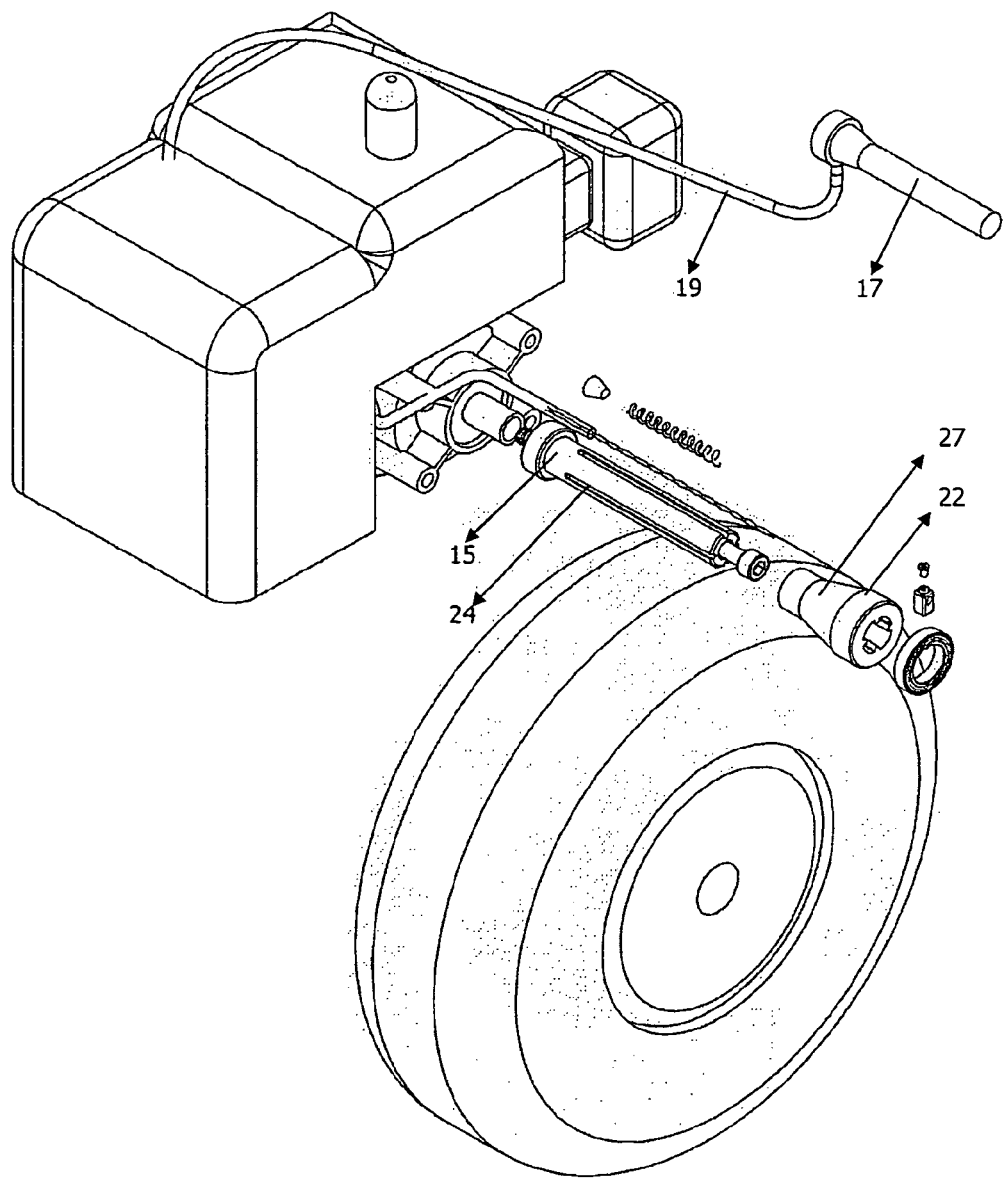
FIG. 17 is an exploded perspective view of the second embodiment of FIG. 11.

According to a second embodiment of the present invention as illustrated in FIGS. 11, 12A and 12B, the friction element (22) has a conical transition zone (27). The friction element (22) has smooth circular zones at both ends of the conical transition zone (27). This zone (27) helps to switch the friction element in between its smooth circular zones at both sides. Based on the assumption that both smooth zones on the right and left sides of the conical zone (27) has sufficient width to contact with the traction surface (16) of the drive wheel (14), the transmission system has now three stages, i.e. the first being only the drive shaft on engagement with the drive wheel, the second being the smooth zone on the left and the third being the smooth zone on the right of the conical zone (27). In this case, the shift lever (17) apparently has three stages. If the conical zone (27) of the friction element is adjusted to contact the surface of the drive wheel, a continuously variable speed transmission having a shift ratio in between those set by the circular zones at both sides can be achieved. Use of a conical or stepped friction element eliminates the possibility of excessive tire wear that might originate from the presence of grooves on the drive shaft.

The grooves (24) drilled on the drive shaft will help a better grip of the draft shaft (15) with the traction surface (16) of the drive wheel. While it is true that these grooves may result in an increased wear on the tire, it may still be preferable have similar longitudinal grooves on the outer surfaces of the friction element (22) if the user frequently rides on slippery surfaces.

In order to enhance the grip between the drive shaft (15) and the traction surface (16) of the drive wheel (14), outer surface of the drive shaft (15) and/or the friction element (22) may be provided with recesses (not shown) having a depth typically smaller than a few millimeters. Likewise, small projections of the same size may serve the same purpose. These projections and/or recesses may be machined to the periphery of the drive shaft (15) longitudinally either at an acute angle or in parallel formation to the guiding grooves (24).

The invention claimed is:

1. A direct drive transmission system comprising a drive shaft (15) adapted to be coupled via a coupling (25) at its inner end to a motor shaft (12), a friction element (22) which rotates with the rotation of the drive shaft and which can be actuated longitudinally, during rotation, on the primary axis of said drive shaft, characterized in that the system further comprises,
 a roll bearing (20) comprising at least an inner ring (31) and an outer ring (32), said roll bearing being fixedly attached around at least part of the periphery of its inner ring (31) to an end of said friction element (22) and where said inner ring (31) has an inner diameter that is larger than the outer diameter of said drive shaft (15),
 a stopper (21) which is fixedly attached to the outer ring (32) of said roll bearing (20), said stopper being adapted to affix a wire (26), which when pulled, moves longitudinally said friction element (22) towards the inner end of said drive shaft (15) so as to allow engagement of said friction element onto a traction surface (16) of a drive wheel (14).

2. A direct drive transmission system as set forth in claim 1 wherein the friction element (22) is guided onto said drive shaft (15) by means of grooves (24) and corresponding projections (30) located longitudinally on said drive shaft and the inner surface of said friction element.

3. A direct drive transmission system as set forth in claim 1 wherein said friction element (22) has a conical zone (27).

4. A direct drive transmission system as set forth in claim 1 wherein the system further comprises a protrusion cable (19) attached to a shift lever (17) adapted to set the longitudinal location of said friction element (22).

5. A direct drive transmission system as set forth in claim 4 wherein the system further comprises a protruder (18) which prevents the wire (26) from bending.

6. A direct drive transmission system as set forth in claim 5 wherein the system further comprises a spring (23) located in between the protruder (18) and the stopper (21) so as the prevent the friction element (22) to unintentionally slide inwardly and shift the transmission.

7. A direct drive transmission system as set forth in claim 6 wherein said spring (23) is preloaded before installation such that it pushes said friction element (22) towards the outer end of the drive shaft (15) so as the disengage friction element (22) when the shift lever (17) is released by the user.

8. A direct drive transmission system as set forth in any of the preceding claims wherein said roll bearing (20) is a ball bearing.

9. A direct drive transmission system as set forth in any of the preceding claims wherein the outer diameter of said roll bearing (20) is smaller than the outer diameter of said friction element (22).

10. A direct drive transmission system as set forth in any of the preceding claims wherein the friction element (22) is provided with projections and/or recesses machined longitudinally around the periphery of drive shaft either at an acute angle or in parallel formation to the primary axis of said friction element.

11. A direct drive transmission system as set forth in any of the preceding claims wherein the drive shaft (15) is provided with projections and/or recesses machined longitudinally around the periphery of drive shaft either at an acute angle or in parallel formation to the guiding grooves (24).

12. A direct drive transmission system as set forth in claim 1 wherein said friction element (22) has at least two stages having different diameters.

13. A vehicle, particularly a scooter, a go-cart or a motorcycle equipped with the transmission system of any of the preceding claims.

* * * * *